United States Patent
Batkin, III

(10) Patent No.: US 10,894,728 B2
(45) Date of Patent: Jan. 19, 2021

(54) DEVICE FOR TREATING WATER TO REDUCE THE SIZE OF THE WATER CLUSTERS, INCREASE DISSOLVED OXYGENATION LEVELS, PRODUCE FREE HYDROGEN ATOMS, PRODUCE

(71) Applicant: Fred A. Batkin, III, Visalia, CA (US)

(72) Inventor: Fred A. Batkin, III, Visalia, CA (US)

(*) Notice: Subject to any disclaimer, the term of this patent is extended or adjusted under 35 U.S.C. 154(b) by 64 days.

(21) Appl. No.: 15/799,035

(22) Filed: Oct. 31, 2017

(65) Prior Publication Data

US 2018/0118586 A1     May 3, 2018

Related U.S. Application Data

(60) Provisional application No. 62/415,400, filed on Oct. 31, 2016.

(51) Int. Cl.
    *C02F 1/48*      (2006.01)
    *B01F 3/04*      (2006.01)
    *B01F 5/04*      (2006.01)
    *C02F 103/32*      (2006.01)

(52) U.S. Cl.
CPC .......... *C02F 1/485* (2013.01); *B01F 3/04503* (2013.01); *B01F 5/0413* (2013.01); *C02F 2103/32* (2013.01); *C02F 2201/002* (2013.01); *C02F 2201/48* (2013.01); *C02F 2301/02* (2013.01); *C02F 2303/26* (2013.01)

(58) Field of Classification Search
CPC .. C02F 1/485; C02F 2103/32; C02F 2301/02; C02F 2201/48; C02F 2303/26; C02F 2201/002; B01F 3/04503; B01F 5/0413; B03C 1/00; B03C 1/032; B03C 1/034; B03C 1/08; B03C 1/14; B03C 1/22; B03C 2201/22; B03C 1/284; B03C 1/02; B03C 1/031; B03C 1/0332; B03C 1/0335; B03C 1/286; B03C 2201/28; B03C 2201/18; B01D 21/00; B01D 21/0009; B01D 46/0034; B01D 2201/4069; B01D 35/06
USPC .............. 210/222, 695, 167.03, 167.29, 223; 209/38, 39, 40, 509, 562, 609, 220, 209/223.1, 226, 230, 232, 368, 478
See application file for complete search history.

(56) References Cited

U.S. PATENT DOCUMENTS

| | | | | |
|---|---|---|---|---|
| 2,149,764 | A | * | 3/1939 | Frei ........................ B03C 1/0332 210/223 |
| 3,139,403 | A | * | 6/1964 | Cramer ..................... B03C 1/28 210/222 |
| 3,371,790 | A | * | 3/1968 | Luchetta ................. B03C 1/288 210/223 |

(Continued)

FOREIGN PATENT DOCUMENTS

WO    WO2007031984 A1 * 3/2007 ................ C02F 1/48

*Primary Examiner* — Claire A Norris
*Assistant Examiner* — Ekandra S. Miller-Cruz
(74) *Attorney, Agent, or Firm* — Hayes Soloway PC

(57) ABSTRACT

A magnetic water treatment system for use in treating water for agricultural and other uses. A magnetic column centered around a perforated shearing tube provides a number of magnets amplified by steel rods to deliver water that has smaller water clusters by treating the water with the application of magnetic fields. Magnetic fields perpendicular to the travel of water and in other directions provide for the efficient treatment of the water.

14 Claims, 6 Drawing Sheets

(56) References Cited

U.S. PATENT DOCUMENTS

| | | | | |
|---|---|---|---|---|
| 3,680,705 | A * | 8/1972 | Happ | C02F 1/481 210/222 |
| 4,288,323 | A * | 9/1981 | Brigante | B03C 1/02 210/222 |
| 5,366,623 | A * | 11/1994 | Clair | C02F 1/482 166/66.5 |
| 5,622,622 | A * | 4/1997 | Johnson | A61L 2/02 210/192 |
| 5,667,074 | A * | 9/1997 | Reali | B03C 1/14 209/224 |
| 6,299,768 | B1 * | 10/2001 | Okamoto | C02F 1/481 210/222 |
| 6,325,942 | B1 * | 12/2001 | Freije, III | B01J 19/087 210/222 |
| 9,352,331 | B1 * | 5/2016 | Lee | C02F 1/482 |
| 2002/0056679 | A1 * | 5/2002 | Sato | B01J 19/087 210/222 |
| 2003/0173264 | A1 * | 9/2003 | Yang | B03C 1/284 209/223.1 |
| 2004/0020835 | A1 * | 2/2004 | Chang | B03C 1/286 210/222 |
| 2007/0246430 | A1 * | 10/2007 | Chau | C02F 1/48 210/695 |
| 2012/0261349 | A1 * | 10/2012 | Kolstad | C02F 1/32 210/695 |

* cited by examiner

DEVICE FOR TREATING WATER TO REDUCE THE SIZE OF THE WATER CLUSTERS, INCREASE DISSOLVED OXYGENATION LEVELS, PRODUCE FREE HYDROGEN ATOMS, PRODUCE

CROSS REFERENCE TO RELATED APPLICATIONS

This application claims the benefit of U.S. Provisional Application 62/415,400, filed Oct. 31, 2016, entitled "NOVEL DEVICE FOR TREATING WATER TO REDUCE THE SIZE OF THE WATER CLUSTERS, INCREASE DISSOLVED OXYGENATION LEVELS, PRODUCE FREE HYDROGEN ATOMS, PRODUCE," which is incorporated herein by reference.

BACKGROUND OF THE INVENTION

1. Field of the Invention

The present application relates to the field of water treatment.

The present EMOH system was conceived to provide treated water for agricultural irrigation but can be used in a multitude of other applications. The premise was to deliver water that has smaller water clusters by treating the water with the application of magnetic fields.

Magnetic treatment of water is not new technology and had been deployed by a number of other practitioners include one of the original principals of the current Applicant. All of these prior art devices used a linear design for application of the magnetic field to the water as depicted in FIG. 1. The different devices used a number of magnetic systems including, but not limited to, permanent neodymium magnets, ferrous rod magnets and electromagnetic systems. These systems have been around the industry for over 40 years with limited success. Many of the systems, included systems from the United States, Canada, and Australia, would only be efficacious with certain water types when applied to irrigation practices.

When the inventors of the EMOH system evaluated each of the designs, we found that each of the programs used similar linear magnetic field designs and depended on the magnetic fields treating 100 percent of the water flow through the system.

SUMMARY OF THE INVENTION

The magnetic fields in the prior water treatment units were initially examined with a focus on those that had a higher level of success. It became clear that linear configurations of magnetic fields were not adequate to provide the influence on the water flow regardless of volume and pressures. The Inventor reexamined the basics of water and magnetic fields and designed from scratch a new magnetic field configuration that will significantly increase the number of lines of force necessary to adequately treat the water flow. The result of this evaluation followed by two years of laboratory trials led to the current system that differs significantly from previous systems. The present system does not use linear magnetic lines of force; rather it deploys the magnets in a unique, proprietary design to give rise to force fields that occur in multiple planes. The Inventor has designated this magnetic position to provide nonlinear magnetic lines of force as a polyphonic design.

With the multiple magnets and steel rods the magnetic lines of force form in multiple directions due to the placement of both the magnets and steel rods, each magnet and rod act as a creator of lines of magnetic force by themselves.

Accordingly, it is a principal object of a preferred embodiment of the invention to provide a water treatment system having smaller water clusters.

It is another object of the invention to provide a water treatment system using magnetic fields to provide smaller water clusters for use in irrigation and other systems.

It is a further object of the invention to provide a multi-directional magnetic field by providing metal rods with a number of magnets.

Still another object of the invention is to provide a water treatment system using a Venturi system or pump to add gas into the water stream.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

Figure 1:
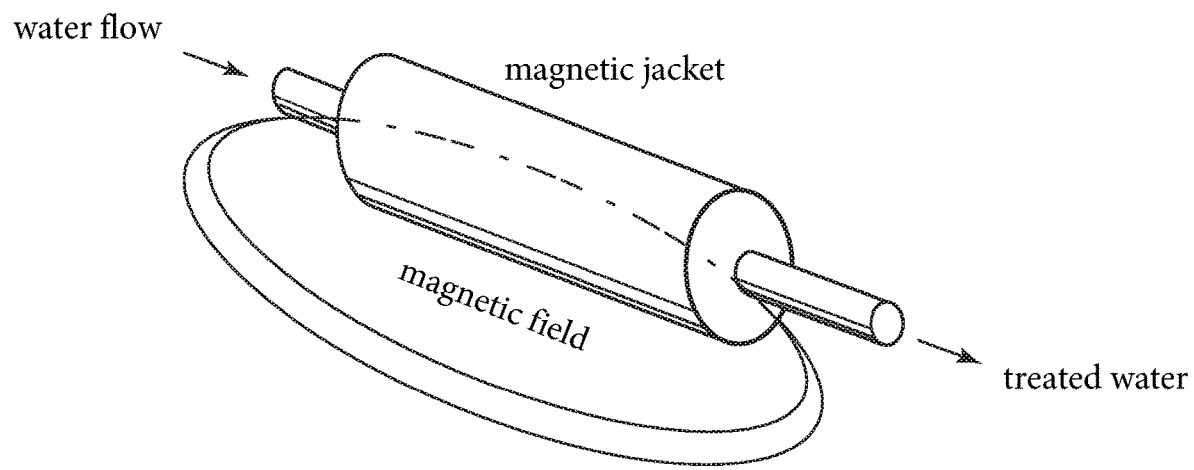
FIG. 1 is a diagrammatic view of a prior art magnetic water treatment system.
Figure 2:
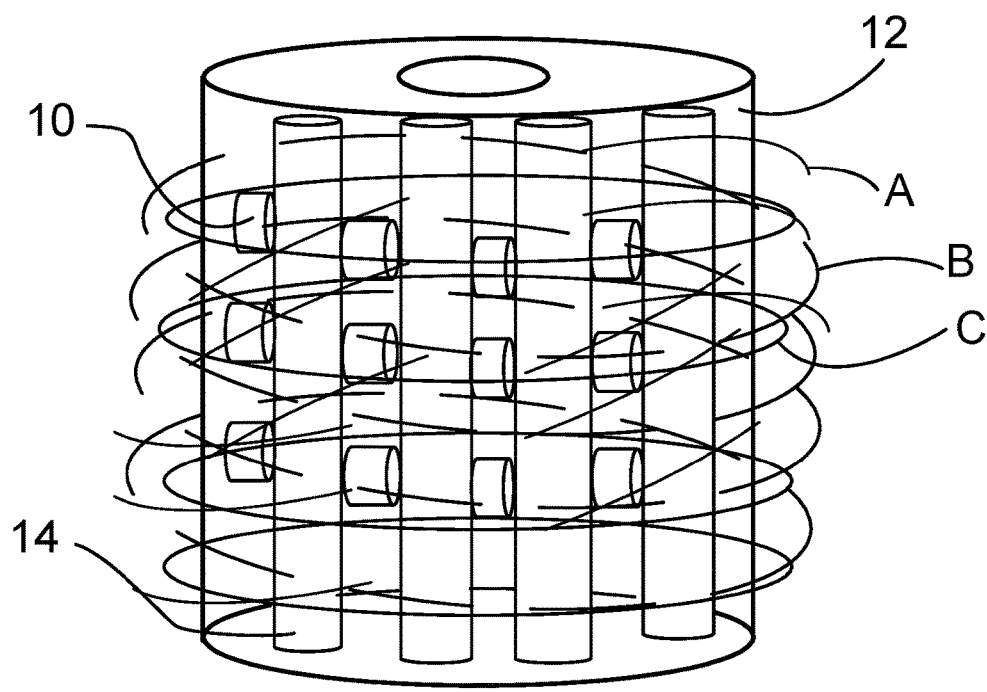
FIG. 2 is a diagrammatic view of the current system magnetic column for use in a magnetic water system.
Figure 3:
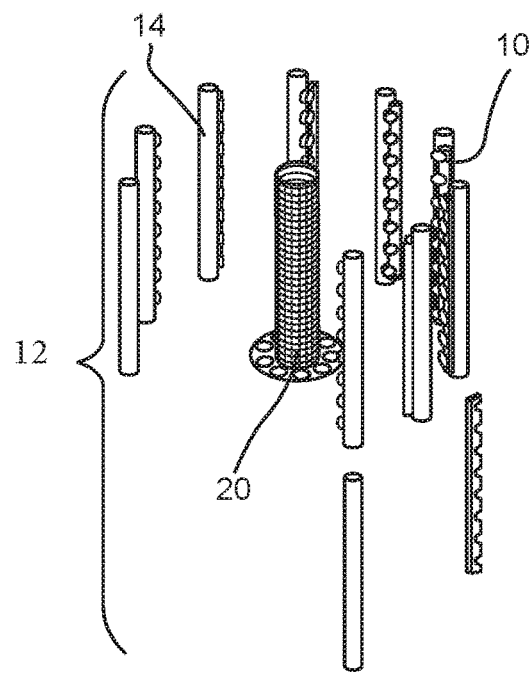
FIG. 3 is an illustrated parts breakdown of several of the components of the column of FIG. 2.
Figure 4:
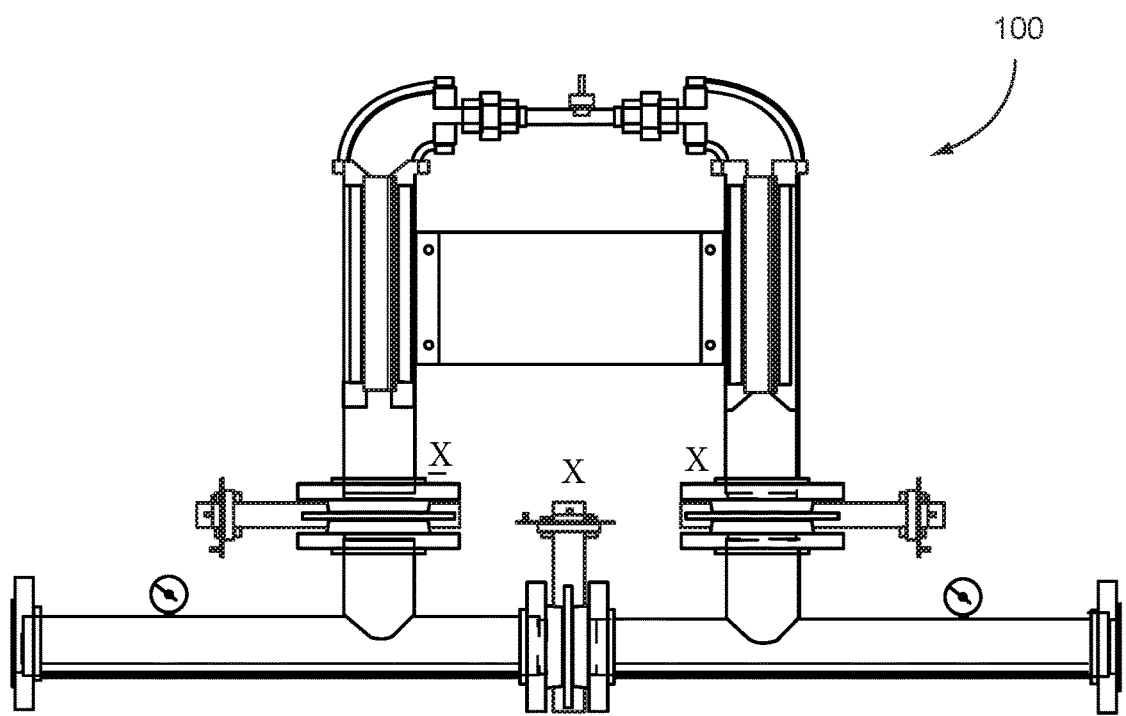
FIGS. 4-9 are diagrammatic views of the water flow through a magnetic water treatment system incorporating a magnetic column.

The present invention as shown in the provide FIGS. 2-9 sets forth a magnetic water treatment system. The magnetic configuration in the columns is one major difference between the prior art systems and the current magnetic water treatment system. The design provides a polyphonic array of magnetic lines of force to insure the water is evenly treated as it moves through the column. The placement of the neodymium magnets 10 within the column 12 and the use of steel rods 14 to amplify the lines of force such as for example A, B, C & D to create the polyphonic effect. The steel rods 14 run linearly through the column 12 while the magnets 14 are placed perpendicular to the rods. This allows each magnet to emit its own array of lines of force, for example (A, B, C) throughout the column and maximize the exposure to the water molecules to the different electronic force lines as they move through the column.

The drawing has in many embodiments underrepresented the total lines of force insofar and should be take only as a simplified depiction of the fields of magnetic force. In fact, the arrangement of the magnets creates innumerable different lines of force, not just four. It has long been known that magnetic forces working on water clusters achieve the highest effectiveness if they are applied perpendicularly to the flow of the clusters. In the old linear model, the placement of the magnets in a single plane on the outside of the flow did not take into account the passing any liquid through a pipe creates significant turbulence resulting in many of the water clusters not moving perpendicular to the linear lines of magnetic force. The genius of the EMOH arrangement is that using multiple magnets, each with their own force fields that intersect with each other and amplifying the magnetic force with the steel rods that hold the magnets in place, we have created a virtually unlimited number of force fields to act on the water clusters. In addition, by use of the shearing tubes to physically divert the water in either the compressive phase (FIG. 6) or the turbulence column (FIG. 8), it is possible to expose virtually every water cluster to a perpendicular magnet.

Each column 12 will preferably have anywhere from 64 to 128 individual magnets 10 and as many as 6 to 20 steel rods 14 depending on the diameter of the device. Each individual magnet creates its own series of lines of force thus multiplying the array by the number of individual magnets plus the steel rods. The purpose is to assure that the water crosses a perpendicular force line as it passes through the column. An in-depth review of the published literature plus a private review of unpublished notes from Nicholas Tesla indicates that the water should past through perpendicular lines to maximize the impact and adequately treat the water. The action maximizes the ionization process to breakdown the water clusters which allows the water to more readily accept dissolved oxygen. It is this polyphonic exposure process that assures a consistent result of water treatment and reduces the variability of treatment to various water conditions. In addition to the magnet array, the core of the column contains a perforated stainless-steel shearing tube 20 (FIG. 2) designed to mechanically scrub the water clusters, aiding in their breakup into smaller clusters. The Inventor has conducted four years of laboratory testing to assure that the magnet configuration works on multiple water sources including well water, natural lake and river water and contaminated water from waste water lagoons and treatment ponds.

EMOH Flow Design

The EMOH ("Electron Magnetics Oxygen and Hydrogen") device 100 (FIG. 4) is designed to treat a portion of a stream of water R flowing through a primary distribution line by diverting it from the main line through the EMOH device by means of three valves X that control the amount of water diverted and the pressures in the EMOH itself. The water is treated in three separate columns ("stages") as it flows through the device and is ultimately returned to the primary distribution line.

Figure 5:
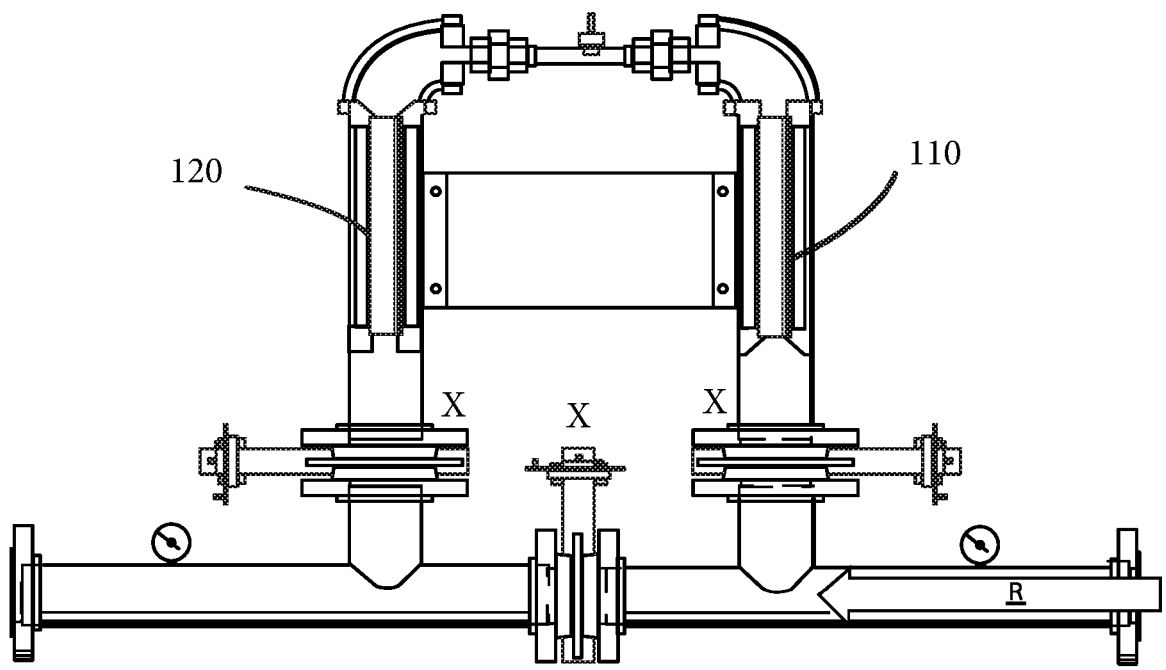
Figure 6:
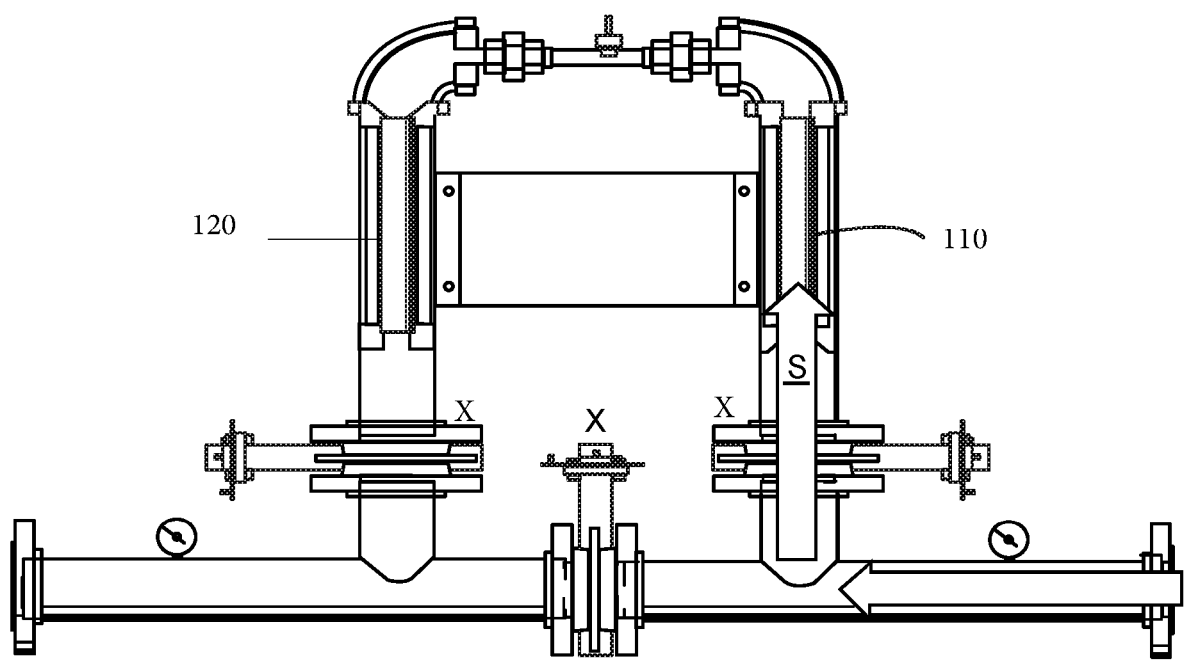
Figure 7:
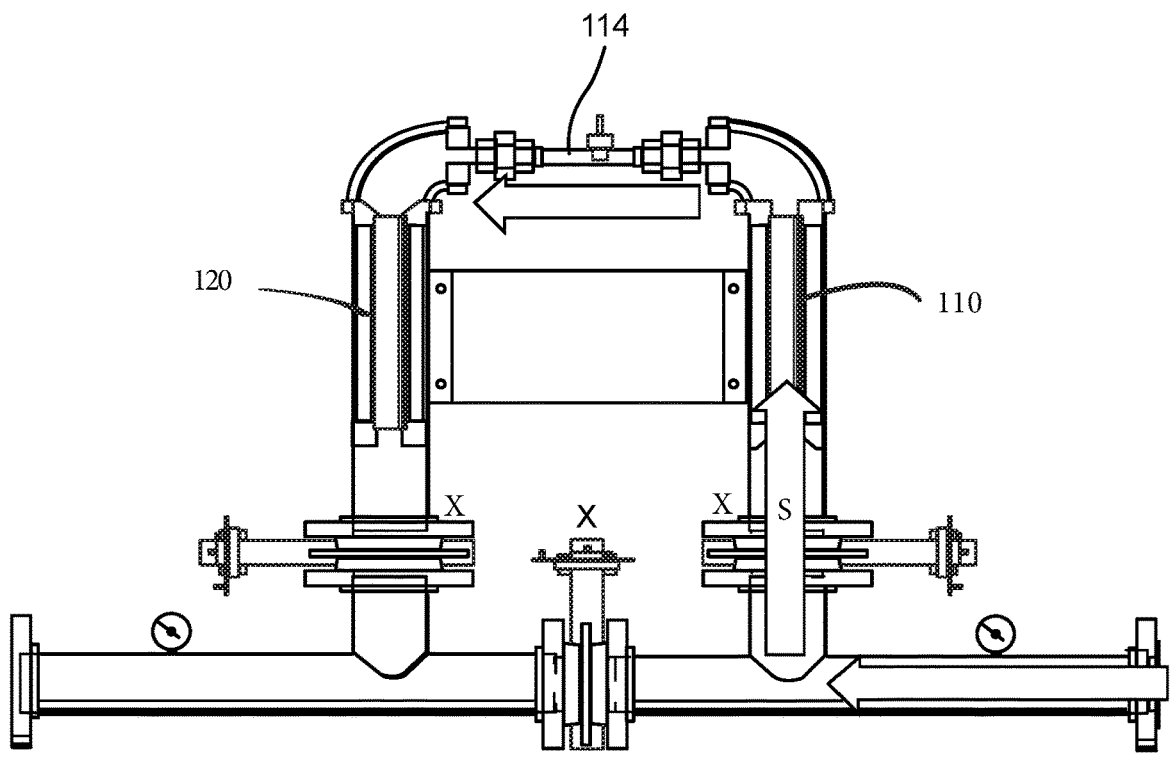
Figure 8:
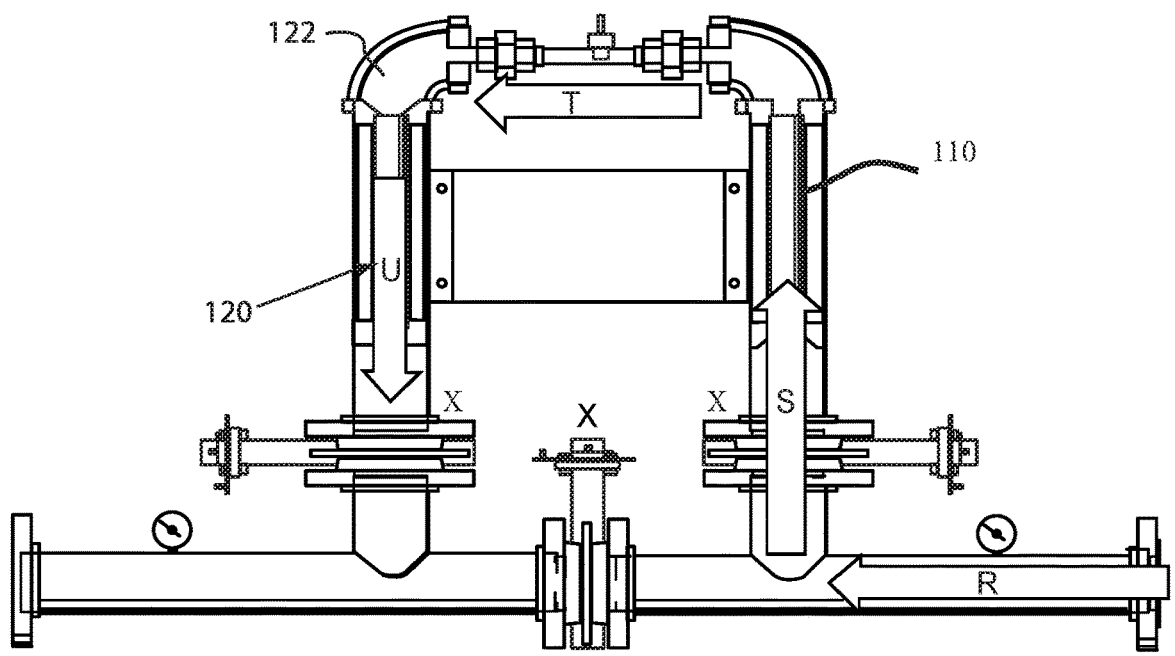
Figure 9:
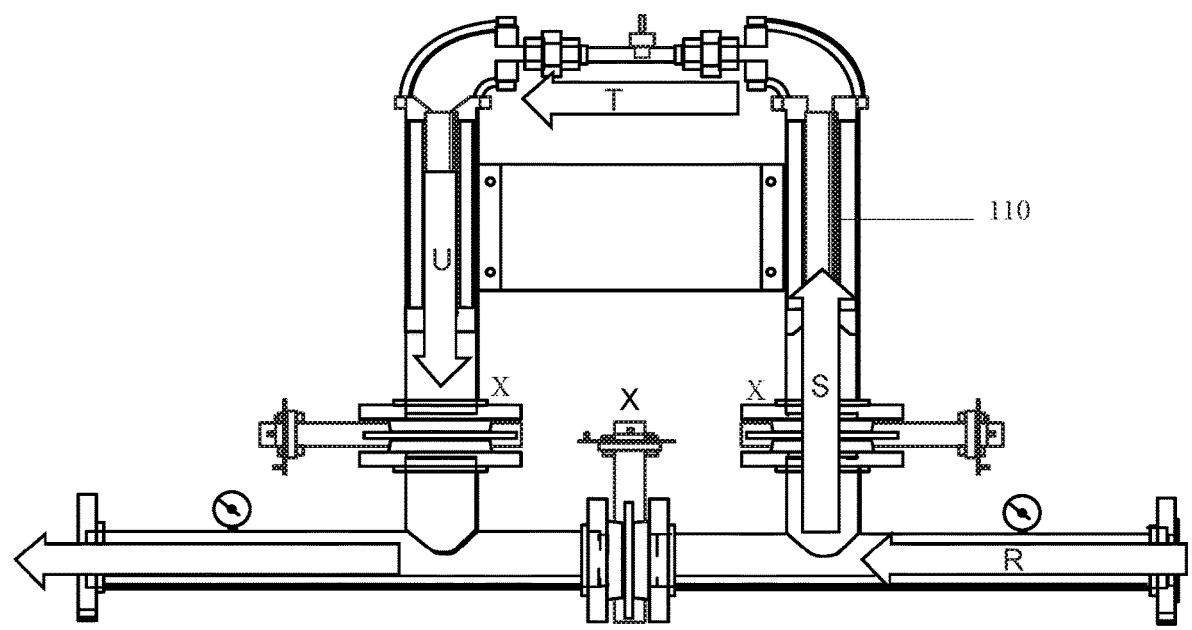
Figure 10:
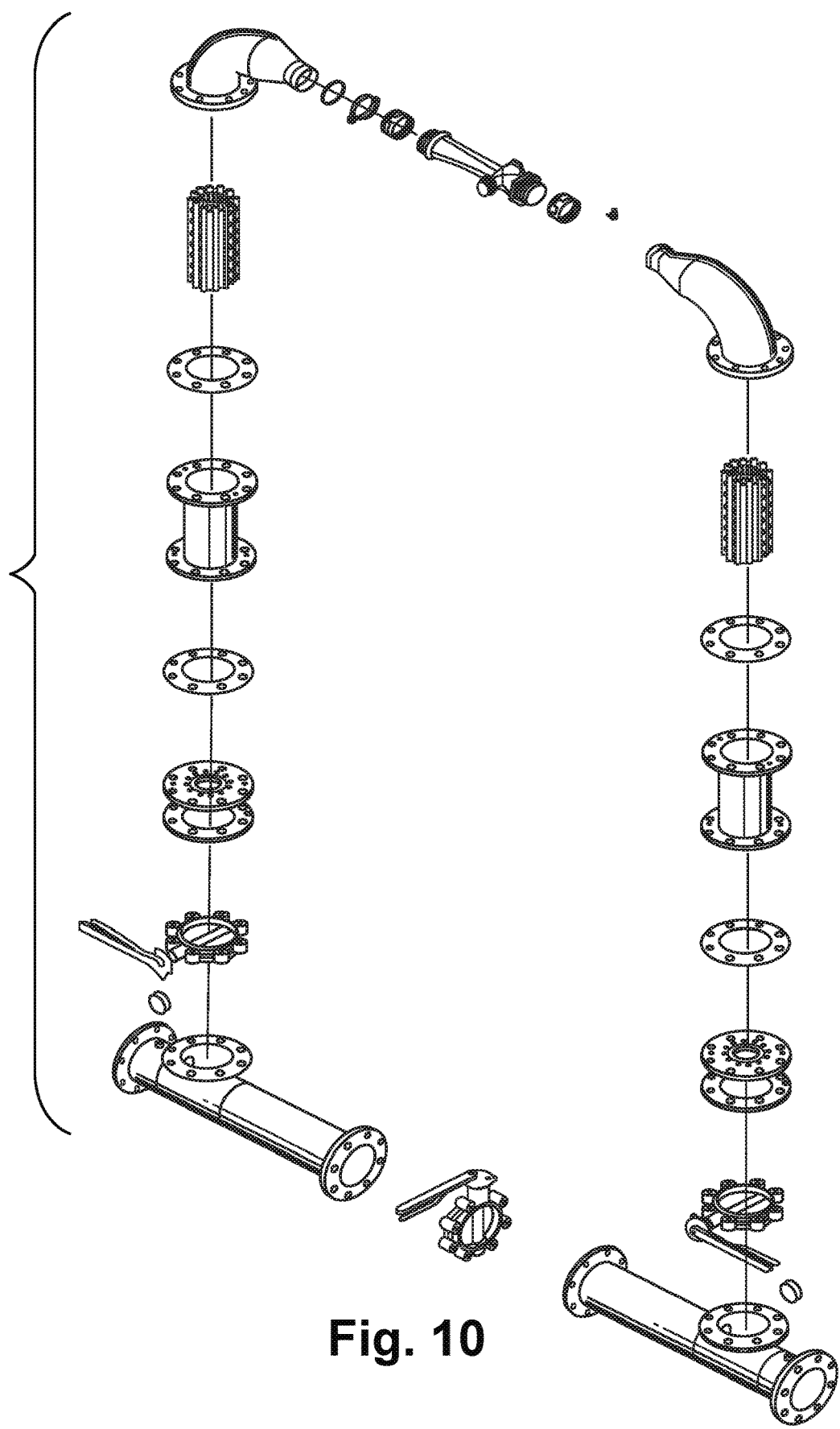
FIG. 10 is an illustrated parts breakdown of several of the components of the magnetic water treatment system of FIGS. 4-9.

Stage 1—Compression Column: As shown in FIGS. 5-6, the diverted stream S first enters the Stage 1 treatment column 110, which may be arranged as in the column 12 above. In this state, the stream is compressed through a pressure differential between the inlet valve X and the Venturi system 114 that comprises Stage 2. The compression allows maximum exposure of the water molecules to the magnetic lines of force (FIGS. 2-3), where the process of breaking down the water clusters to smaller units begins. As the water passes through the magnetic field, an electrical current is generated and the process of electrolysis begins to break the hydrogen and oxygen bonds. The water also passes around and through the perforated stainless-steel shearing tube 20, further breaking down the clusters.

Stage 2—Venturi: The EMOH systems uses a simple Venturi injection system 114 (FIG. 7) to add any mixture of gases (not shown) to the stream T during the treatment process. For most applications the use of atmospheric air provides the best mix of gases and oxygen into the water. The system can be adapted to insert pure gases such as oxygen, nitrogen or any other gas the application requires, for an example the treatment of leachate water from landfills works better with pure oxygen than with atmospheric oxygen. The system can be equipped with commercially available Venturis for natural insertion of the air, or in some preferred embodiments can be equipped with an injector that works with a forced air pump for rapid infusion of oxygen. The Venturi by itself is not considered a part of a critical part of the invention since it is already available through commercial vendors.

The range of gas to liquid ratio in the Venturi will depend on the application to which EMOH is being put. For example, in an application to increase the efficiency and lower cost in a reverse osmosis scenario, the Venturi may be closed entirely without gas permitted into the system. On the other hand, in a water clean-up situation where there are substantial solids in the water, we may add a compressor to raise the volume of introduced gases beyond that which a Venturi of any size can accommodate. This may work in for example dairy lagoons, which have massive amounts of manure in the liquid. In an agricultural application, one may use the Venturi to introduce atmospheric gasses into the water stream to not only increase the dissolved oxygen, but to also supplement the stream with the additional gasses necessary to enhance plant growth. The size of the Venturi is dictated by the size of the EMOH and the amount of water passing through. The physical and chemical properties of the outflow can be monitored to optimize the different variables.

Stage 3—Turbulence Column: Subsequent to leaving the Venturi, the stream U enters the turbulence column 120, which includes several design features to facilitate the breaking down of the water clusters and the uptake of oxygen. One design feature is a specifically designed nozzle 122 located on the upstream side of the column 120, which spreads the water flow evenly around the surface areas of the column 120. This nozzle forces the water to be divided between the inner and outer sides of the stainless-steel shearing tube 20. The shearing tube 20, the other design feature, is positioned in the center of the column 120 to allow water to flow under pressure from the nozzle on both sides of the tube. The purpose of the shearing tube is to mechanically break up the water molecules along with the effect of the magnetic fields. The result is additional hydrogen molecules being freed from the H2O bonds resulting in the production of free hydrogen. The free hydrogen then can combine with H2O molecules to form H2O2 hydrogen-peroxide which is helpful in cleaning scaling from heat exchanger and cooling tower inner tube systems. The combination of the injected oxygen from Stage 2, the polyphonic magnetic fields and the shearing tube result in the creation of nanobubbles in which entrap the gases introduces during Stage 2. Nanobubbles are significant because they are less buoyant than normal bubbles due to the relatively small amount of gas that can be contained. The nanobubbles have a coefficient of friction that approaches the force of their buoyancy, resulting in the gases being retained in the water much longer than would be the case without them. It is this phenomenon that results in water treated by an EMOH device to be able to carry significantly more oxygen to its destination and to maintain levels of dissolved oxygen for a greatly extended period.

Upon exiting Stage 3 the treated water S is reinserted into the primary distribution line through which it flows to its intended application.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A magnetic water treatment system comprising:
   a water inlet and a water outlet;
   a chamber between the water inlet and the water outlet for treating water flowing along a water flow path from the water inlet to the water outlet;
   a plurality of metal rods populating a perimeter of said chamber, wherein each of said metal rods is approximately parallel to water flow path, wherein each of said metal rods has a consistent external circumference; and
   at least one magnet externally mounted on the consistent external circumference of each of the metal rods, thereby applying magnetic lines of force from the magnets to the water in said chamber.

2. The magnetic water treatment system of claim 1, wherein between 6 and 20 metal rods populate the perimeter of said chamber.

3. The magnetic water treatment system of claim 1, wherein between 4 and 1 magnets are mounted on said plurality of metal rods.

4. The magnetic water treatment system of claim 1, wherein between 6 and 20 metal rods populate the perimeter of said chamber, a total of between 64 and 128 magnets are mounted on said metal rods, and said metal rods are made of steel.

5. The magnetic water treatment system of claim 4, wherein each of said magnets mounted on said metal rods has a magnetic line of force not coincident with a line of force of any of the other magnets mounted on said metal rods.

6. The magnetic water treatment system of claim 1, wherein said magnets are arranged to provide an array of magnetic lines of force perpendicular to the water flow path.

7. The magnetic water treatment system of claim 1, further comprising a Venturi chamber between the water inlet and the water outlet thereby adding gases to the water.

8. The magnetic water treatment system of claim 1, further comprising a Venturi chamber between the chamber and the water outlet thereby adding gases to the water.

9. The magnetic water treatment system of claim 1, further comprising a compressor between the water inlet and the water outlet thereby adding gases to the water.

10. The magnetic water treatment system of claim 1, further comprising a stainless-steel shearing tube in the chamber aligned parallel to the metal rods.

11. The magnetic water treatment system of claim 7, wherein the array of magnetic lines of force occur in multiple planes.

12. The magnetic water treatment system of claim 1, wherein the chamber further comprises a plurality of cylindrical magnets externally mounted on each of the metal rods, the cylindrical magnets oriented perpendicularly on each of the metal rods.

13. The magnetic water treatment system of claim 10, wherein the at least one magnet is oriented to face the stainless-steel shearing tube.

14. The magnetic water treatment system of claim 1, wherein the plurality of metal rods are external to the at least one magnet.

* * * * *